United States Patent
Chin et al.

(10) Patent No.: US 7,174,149 B2
(45) Date of Patent: Feb. 6, 2007

(54) METHOD AND SYSTEM FOR INDIRECTLY ESTABLISHING A CALL

(75) Inventors: Mary Wonmon Chin, Westmont, IL (US); Douglas Harold Rollender, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 274 days.

(21) Appl. No.: 10/617,697

(22) Filed: Jul. 14, 2003

(65) Prior Publication Data

US 2005/0014481 A1   Jan. 20, 2005

(51) Int. Cl.
*H04Q 7/20* (2006.01)
(52) U.S. Cl. .................... 455/403; 455/404.1; 455/433
(58) Field of Classification Search ................ 455/403, 455/453.1, 445
See application file for complete search history.

(56) References Cited

U.S. PATENT DOCUMENTS 5,689,548 A * 11/1997 Maupin et al. .......... 455/404.1
5,712,900 A * 1/1998 Maupin et al. ............. 455/433
6,038,437 A   3/2000 Zicker
6,167,256 A  12/2000 Yla-Outinen et al.
6,535,730 B1  3/2003 Chow et al.
2002/0111159 A1  8/2002 Faccin et al.
2003/0086538 A1  5/2003 Geck et al.
2005/0014481 A1 * 1/2005 Chin et al. ................. 455/403

OTHER PUBLICATIONS

"NENA Technical Information Document (TID) On PSAP Call Back to All 9-1-1 Callers, Combating Wireles E911 Fraud And Mobile Emergency Service (E911M)", prepared by National Emergency Number Association (NENA), Mobile Emergency Service (E911M) Joint Working Group of the Wireless Technical Committee and the Network Technical Committee, Published by NENA, Mar. 22, 2005, pp. 1-51.
European Search Report dated Dec. 21, 2004.

* cited by examiner

*Primary Examiner*—William D. Cumming (57) ABSTRACT

A call is indirectly established by triggering a call register to request a mobile switching center, associated with a mobile station, to establish a call between the mobile station and a second party.

10 Claims, 6 Drawing Sheets

METHOD AND SYSTEM FOR INDIRECTLY ESTABLISHING A CALL

BACKGROUND OF THE INVENTION

Directly establishing a wireless call with a mobile station may prove difficult or infeasible in certain situations. For example, some Public Service Answering Point (PSAP) switches may not be able to perform a direct call back to a mobile station when an emergency wireless call unintentionally releases. Furthermore, many wireless calls pertain to location specific issues that are difficult for a remotely located service provider to handle.

SUMMARY OF THE INVENTION

The present invention provides a method and system architecture for indirectly establishing a call.

In one embodiment, a call register is associated with a Public Service Answering Point (PSAP) switch and another call register is associated with a mobile switching center (MSC). Besides communicating with the PSAP switch, the call register associated with the PSAP switch also communicates with the call register associated with the MSC. Likewise the call register associated with the MSC communicates with the MSC and the call register associated with the PSAP switch. In this embodiment, the PSAP switch may request the MSC to establish an emergency call between the PSAP switch and a mobile station identified in the request, by sending the request to the call register associated with the PSAP switch. The call register associated with the PSAP switch routes the request to the call register associated with the MSC, and the call register associated with the MSC issues the request to the MSC such that the MSC can page the identified mobile station and connect the mobile station to the PSAP switch.

In another embodiment of the present invention, a second party service provider may indirectly request establishing a call between a mobile station and PSAP or secondary response service. For example, the second party service provider may be a telematics service provider (TSP) providing a private vehicular reporting service—in which case the mobile station is a telematics unit in the vehicle and the secondary response service may be a tow trucking service.

In this embodiment, a call register is associated with the second party service provider and another call register is associated with a mobile switching center (MSC). Besides communicating with the second party service provider, the call register associated with the second party service provider also communicates with the call register associated with the MSC. Likewise the call register associated with the MSC communicates with the MSC and the call register associated with the second party service provider. In this embodiment, the second party service provider, in response to a call from a mobile station, may request the MSC to connect another party (e.g., a PSAP or secondary response service) with the existing call, by sending the request to the call register associated with the second party service provider. The call register associated with the second party service provider sends the request to the call register associated with the MSC, and the call register associated with the MSC issues the request to the MSC such that the MSC connects the additional party to the call. Alternatively, a separate call could be established between the mobile station and the additional party. Furthermore, in this embodiment, geolocation information on the mobile station may be obtained and provided to the additional party when connecting the additional party with the mobile station.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EMBODIMENTS

A requirement for handling wireless emergency calls is the ability for the agent, which answers emergency calls at a Public Safety Answering Point (PSAP) Call Center, to call back the emergency caller. One reason is that if the wireless call drops, the call may need to be recovered to complete the emergency report. The caller may not be able to re-call the PSAP or the caller may have moved into the domain of another PSAP. Another reason for call back is for the PSAP agent to verify the source of the emergency call in order to screen out prank calls.

At many PSAPs today, call back is accomplished to wireline callers through a "flash back" on the inbound trunks. This is not possible for wireless call back for at least two reasons. First, the call may have dropped while the caller was being handed off to a new serving system. Second, even if the caller is within the same serving system after the call drops, the air traffic channel is lost before the PSAP can flash back. The flash back may reach the MSC, but the MSC does not have a traffic channel to complete the call or even the identifier needed to page the mobile station and re-establish a traffic channel.

Figure 1:
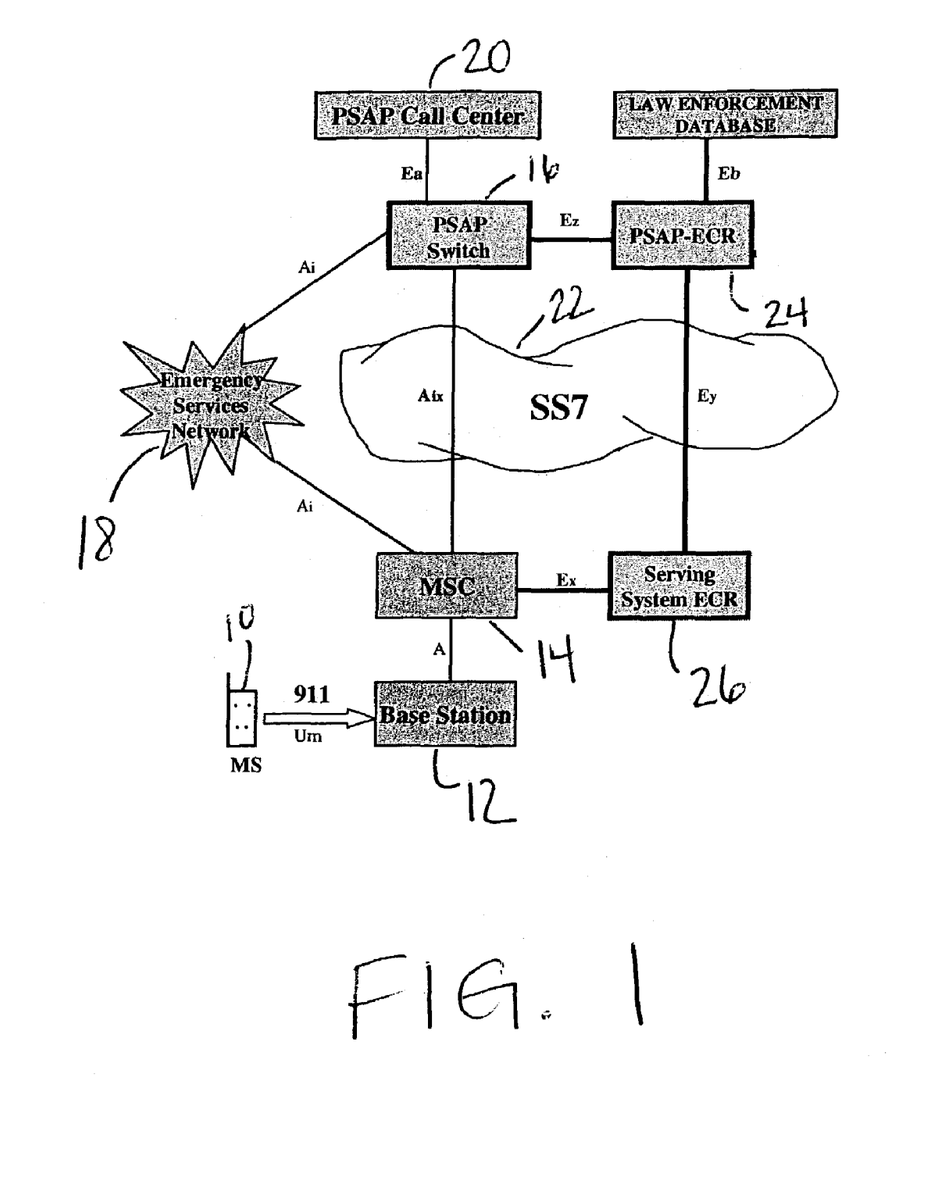
FIG. 1 illustrates an exemplary system architecture in which a first embodiment of the present invention is employed.

FIG. 1 illustrates an exemplary system architecture in which a method for a PSAP to call back a wireless emergency caller may be employed. As shown, a mobile switching center (MSC) 14 receives an emergency call from a mobile station 10 via a base station 12, and delivers the emergency call to a PSAP call center 20 via a PSAP switch 16, the well-known emergency services network 18 and interfaces Ai. The mobile station 10 may be any type of well-known wireless unit such as a mobile phone, PDA, etc. A call back may be placed directly by the PSAP switch 16 to the MSC 14 over an Aix interface in a well-known SS7 network 22.

The architecture further includes a PSAP emergency call register (ECR) 24 associated with the PSAP switch 16 and a serving system emergency call register (SS-ECR) 26 associated with the MSC 14. The PSAP-ECR 24 and the SS-ECR 26 are companion databases containing similar information identifying individual emergency calls and their origin. Their data is coordinated with each other and new call identification data is added from one to the other over an interface Ey of the SS7 network 22. The call identification information is provided by the MSC 14 to the SS-ECR 26 over the Ex interface. The SS-ECR 26 communicates the call information to the PSAP-ECR 24 over the Ey interface. The PSAP switch 16 communicates the call information to the PSAP-ECR 24 over the Ez interface and the PSAP switch 16 communicates the information to the PSAP call center 20 over the Ea interface. In addition the PSAP-ECR 24 may communicate the call information to a law enforcement database directly over a separate interface Eb. The PSAP-ECR 24 and SS-ECR 26 will be described in more detail below.

When the PSAP call center 20 receives the emergency call from the mobile station 10, the call back number is signaled over the Ai interface with the call setup message through SS7/ISUP or the Ey interface between the SS-ECR 26 and the PSAP-ECR 24 where the call data is also stored. If for any reason the emergency call drops, the PSAP call center 20 may initiate a call back directly through the Aix interface if outbound calling facilities, equipment and procedures exist. Alternatively, according to this embodiment of the present invention, a call-back-through-MSC is requested through a message signaled by the PSAP switch 16 and between the PSAP-ECR 24 and the SS-ECR 26 over the Ey interface.

Figure 2A:
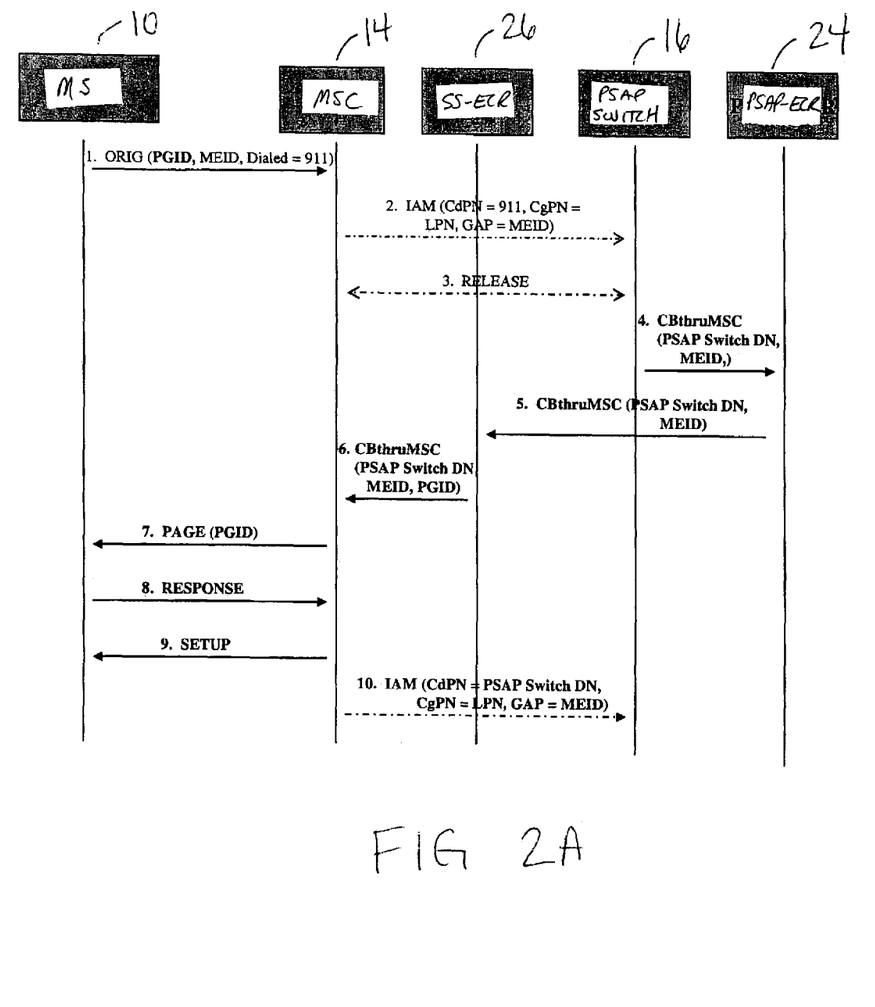
FIGS. 2A–2B are communication flow diagrams illustrating an example of the operation of an indirect call back method according to the present invention.
Figure 2B:
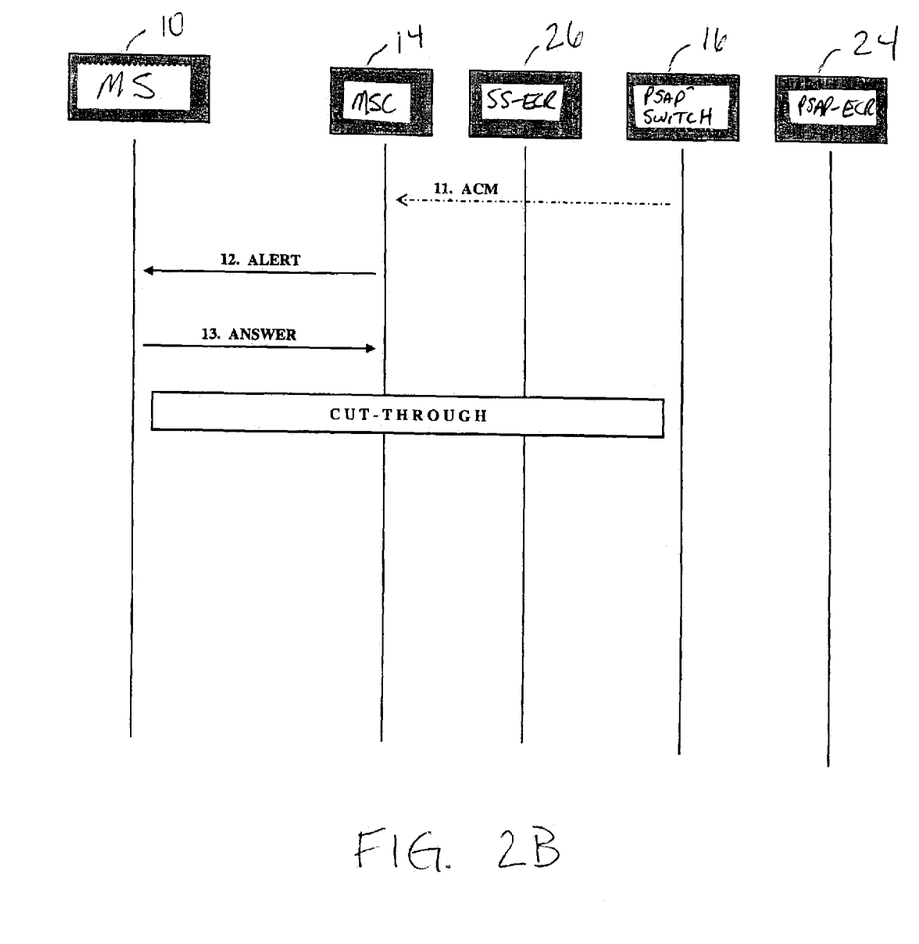

This indirect form of call back will now be described in detail with reference to FIGS. 2A and 2B. FIGS. 2A–2B are communication flow diagrams illustrating an example of the operation of an indirect call back method according to the present invention. As shown in FIG. 2A, when the mobile station 10 originates an emergency call, for example, by dialing 9-1-1 in North America, the call origination message indicates the number dialed (i.e., 911), a mobile equipment identifier (MEID) of the mobile station 10 and a paging identifier (PGID) for the mobile station 10.

The PGID is any one of many identifiers used in standards to page a mobile station when some service, such as a call, is to be delivered to the mobile station. In ANSI-41, the PGID could be a 10-digit mobile identification number (MIN) or a 15-digit International Mobile Subscriber Identifier (IMSI) programmed into the mobile station by the service provider with whom the mobile station user has entered into a service agreement. A default Mobile Station Identity (dMSID) may also be programmed into a CDMA mobile station by its manufacturer and used to page a mobile station for over-the-air activation by a service provider. ANSI-41 also uses the expression Mobile Station Identification (MSID) to mean, collectively, either MIN or IMSI. Accordingly, the PGID may be the MSID. In GSM, the PGID may be the IMSI, a Temporary Mobile Station Identification (TMSI) assigned by the serving system and associated with an IMSI, or, in some cases, the International Mobile Equipment Identity (IMEI) if there is no IMSI or TMSI available.

Each mobile station contains a unique mobile equipment identity (MEID) encoded in the phone by the manufacturer. The MEID may be, for example, an electronic serial number (ESN) as used in ANSI/TIA/EIA-41 systems or an International Mobile Equipment Identity (IMEI) used in GSM systems.

As shown in FIG. 2A, in response to the emergency call, the MSC 14 creates a call record in the SS-ECR 26 that includes among other things a table mapping MEIDs of mobile stations to their PGIDs. The MSC 14 also sends an initial address message (IAM) to the PSAP switch 16. An initial address message is used to establish the call between the PSAP call center 20 and the mobile station 10. As shown, the IAM includes the called party number (CdPN) and the calling party number (CgPN). The called party number is the emergency number dialed by the mobile station (e.g., 911). The calling party number, however, is a unique routable call back number assigned to the MSC 14. This number will be referred to as the "Local Public Safety Number" or LPN hereafter. The LPN can be thought of as similar to the local routing number (LRN) assigned to each local switch to implement wireless number portability (WNP) or thousands block number pooling (TBNP). However, a LPN can only be routed to the switch that owns the number, and the LPN for each switch is unique and is not portable. As further shown in FIG. 2A, the MSC 14 provides the PSAP switch 16 with the MEID of the mobile station in the ISUP generic address parameter (GAP).

The PSAP switch 16 and/or the SS-ECR 26 creates a call record in the PSAP-ECR 24 that includes among other things a table mapping the MEID of the mobile station 10 to the LPN of the MSC 14.

If an event requiring the PSAP call center 20 to call back the mobile station 10 occurs, for example unintentional release of the emergency call as shown in FIG. 2A, then an indirect call back may be requested by the PSAP call center 20. In response to an indirect call back request, the PSAP switch 16 sends a call back through MSC (CBthruMSC) request to the PSAP-ECR 24. The CBthruMSC request includes the routing or directory number (DN) of the PSAP switch 16 and the MEID of the mobile station 10 to call back.

Using the MEID received in the CBthruMSC request, the PSAP-ECR 24 determines the LPN of the associated MSC 14. Using the LPN, the PSAP-ECR 24 accesses a look-up table stored therein that maps LPNs to SS-ECR addresses (e.g., a point code in the SS7 network). From this look-up table, the PSAP-ECR 24 accesses the address for the SS-ECR 26, and sends the CBthruMSC request to the SS-ECR 26 over the Ey interface. Alternatively, the PSAP-ECR 24 may route the CBthruMSC request to the SS-ECR 26 by using the well-known SS7 global title translation where the LPN is the global title.

When the SS-ECR 26 receives the CBthruMSC request, the SS-ECR 26 uses the MEID in the request to access the PGID for the mobile station 10 from the mapping table stored therein. The SS-ECR 26 adds the PGID to the CBthruMSC request and sends the request to the MSC 14. The MSC 14 recognizes the CBthruMSC requests as an emergency call back and pages the mobile station 10 using the PGID.

If the mobile station 10 responds, then the MSC 14 sets up a traffic channel with the mobile station 10. The MSC 14 also sends an IAM to the PSAP switch 16. When PSAP switch 16 answers by sending an address complete message (ACM), the MSC 14 alerts the mobile station 10 of an incoming call, which the mobile station 10 can then answer.

As described above, the method and architecture according to this embodiment of the present invention permits a PSAP call center to indirectly call back a mobile station.

A wireless emergency data message or call may be initiated to a second party service provider. This may be, for example, a telematics service provider (TSP) that offers a private vehicular emergency reporting service. The second party service provider screens the emergency messages and provides for the appropriate response either through a Public Service Answering Point (PSAP) if there is a true emergency, such as fire or bodily injury, or a secondary response service (e.g., a tow truck rather than an ambulance) for lesser emergencies. The response to a true emergency requires a wireless emergency call, such as an E911 call, to be placed by the second party service provider on behalf of the original emergency caller. However, the call center for the second party service provider may be located a substantial distance (e.g., cross-country) from the site of the emergency. Since E911 calls are routed by a local serving MSC to the nearest PSAP (based on Wireless E911 geolocation information known to the original serving MSC), the second party service provider will want to originate the E911 call through that local MSC on behalf of the emergency call originator. The second party service provider also may want to stay on the call to the PSAP as an additional party to facilitate the transfer of information to the PSAP.

A second embodiment of the present invention is directed to providing for indirect calling initiated by a second party service provider. As will be apparent from the following description, the second party service provider could be a private vehicular emergency reporting service, another PSAP, etc. However, for the purposes of providing an exemplary description, the case where the second party service provider is a telematics service provider (TSP) will be described.

Figure 3:
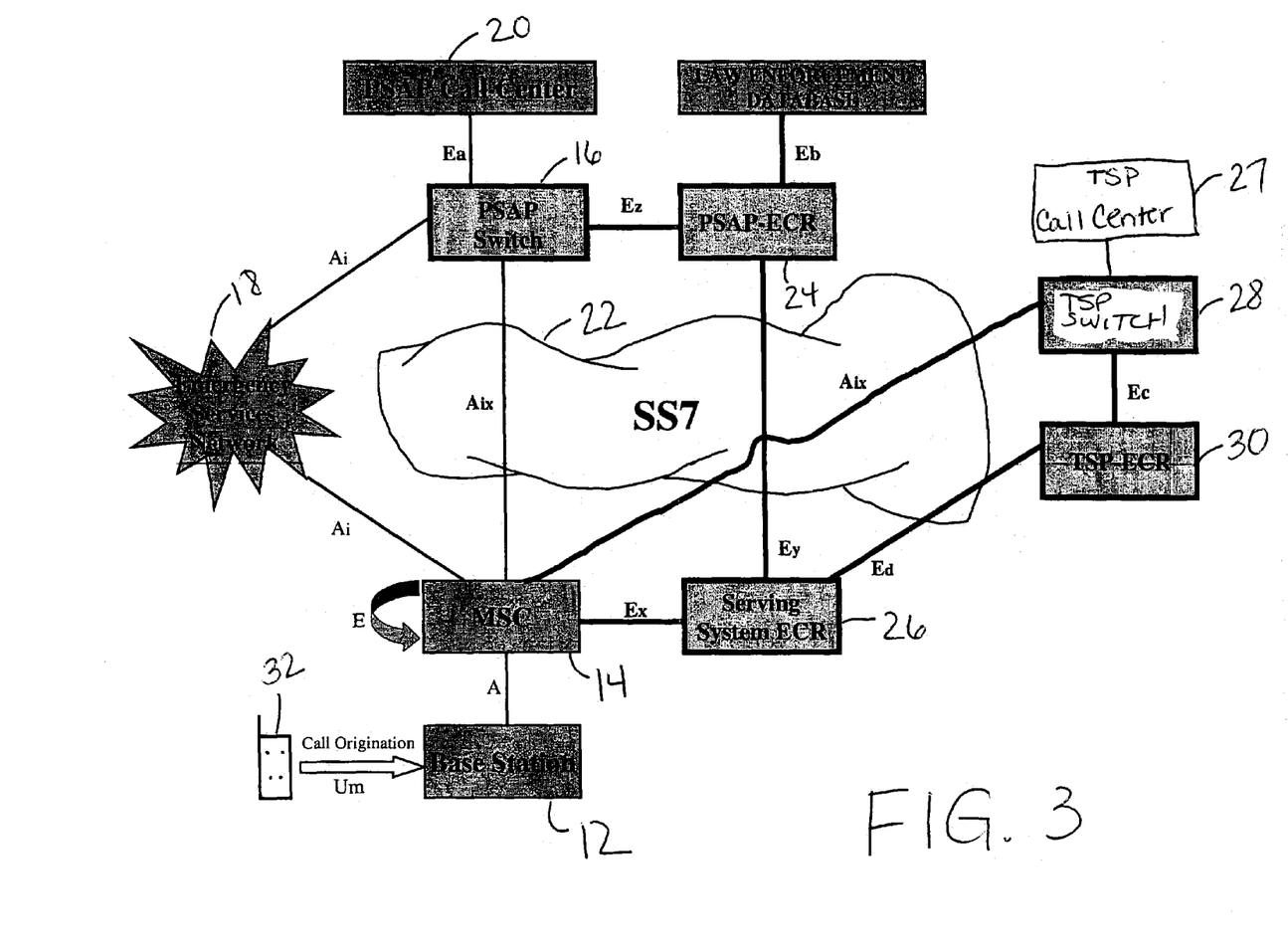
FIG. 3 illustrates another exemplary system architecture in which a second embodiment of the present invention is employed.

FIGS. 3 illustrates an exemplary system architecture for this second embodiment. As shown, the system architecture of FIG. 3 is the same as the system architecture of FIG. 1 except that the mobile station 10 has been replaced by a telematics unit (TU) 32 and a second party service provider, in this case a TSP call center 27, TSP switch 28 and associated ECR 30 have been added. As is well-known, a telematics unit 32 may include a sensor or group of sensors associated with a mobile station that cause the mobile station to contact the TSP call center 27 when one or more events are sensed. Additionally, the telematics unit 32 may include a call button that a vehicle operator depresses to trigger contact with the TSP call center 27.

The TSP switch 28 communicates with the MSC 14 over an Aix interface of the SS7 network, and the TSP-ECR 30 communicates with the SS-ECR 24 over an interface Ed of the SS7 network.

Figure 4:
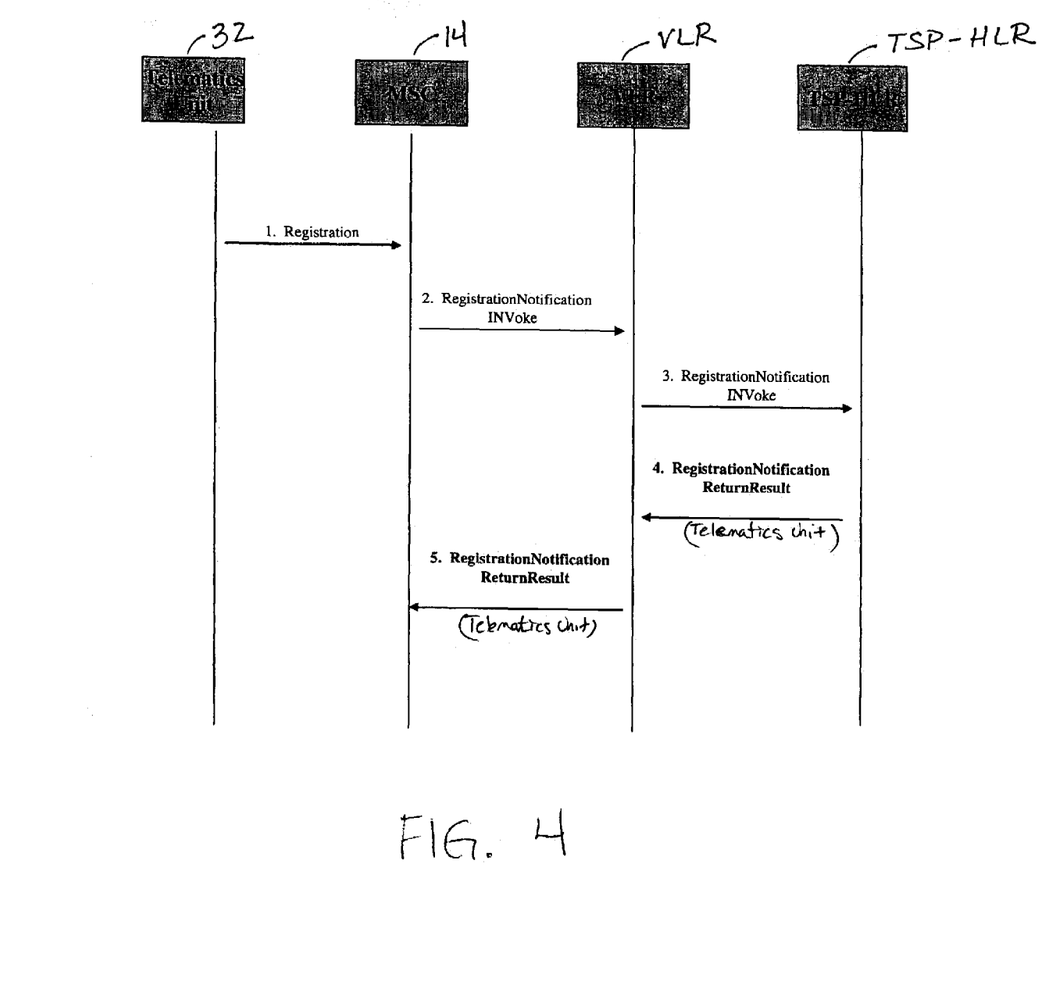
FIG. 4 is a communication flow diagram illustrating an example registration of a telematics unit.

As with mobile stations, telematics units perform a registration operation to notify the local wireless service provider that the telematics unit is present in the local wireless service provider's coverage area. FIG. 4 illustrates a communication flow diagram of this registration process.

As shown, the TU 32 sends a registration message that is received at the MSC 14. The registration message includes among other things the MEID of the TU 32. The MSC 14 determines the TU 32 is within its coverage area, and in the well-known manner notifies a visitor location register (VLR) associated with the MSC 14 of the registration. The VLR then registers the TU 32 with the home location register (HLR) of the TSP in the well-known manner. The TSP-HLR authorizes the TU 32 and provides the VLR with profile information on the TU 32 including an indication that the TU 32 is a telematics unit. This indication may come in the form of a flag set in the message sent from the TSP-HLR to the VLR. The VLR then communicates this profile information and the indication that the TU 32 is a telematics unit to the MSC 14. In this manner, the MSC 14 is informed as to which mobile stations are telematics units. In one exemplary embodiment, the MSC 14 maintains a table of MEIDs for registered mobile stations and sets a flag associated with the MEID of the TU 32 to indicate the TU 32 is a telematics unit.

Figure 5:
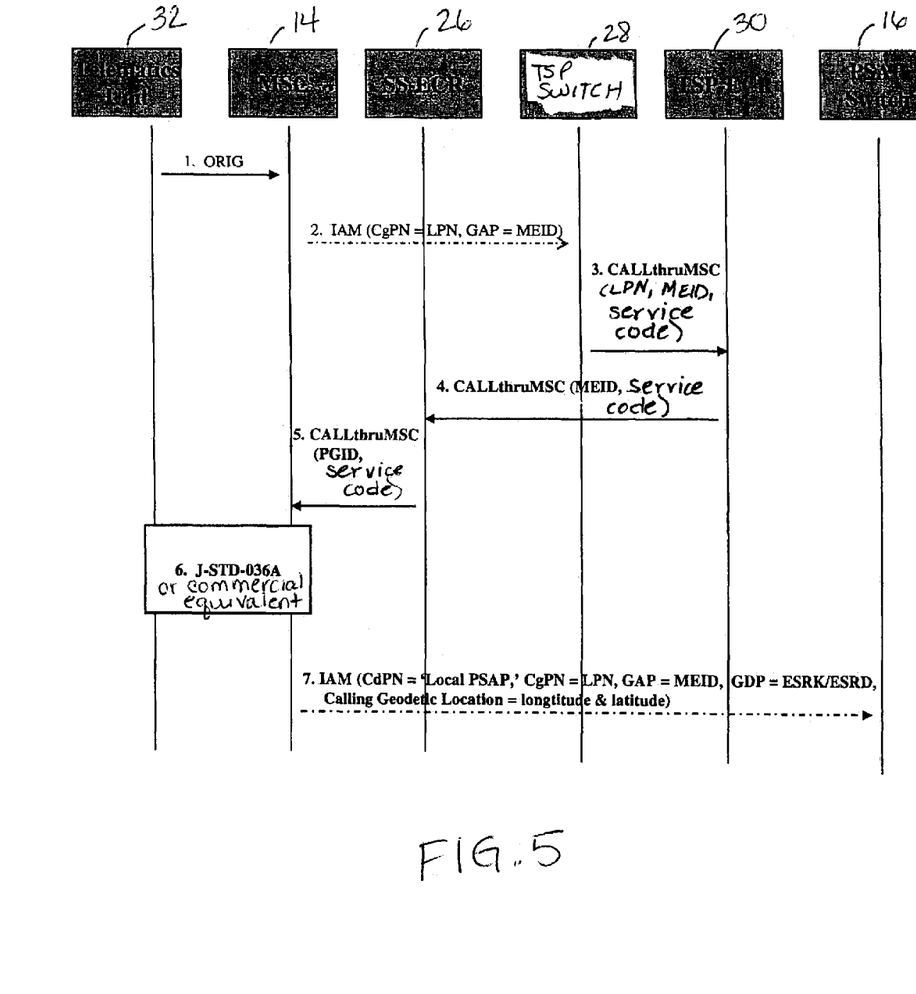
FIG. 5 is a communication flow diagram illustrating an example operation of an indirect calling method according to the present invention.

FIG. 5 is a communication flow diagram illustrating an example operation of an indirect calling method according to this embodiment of the present invention. As shown, when the TU 32 originates a call, the call origination message indicates the number dialed (i.e., the number of the TSP call center 27), a mobile equipment identifier (MEID) of the TU 32 and a paging identifier (PGID) for the TU 32.

From the MEID of the TU 32, the MSC 14 identifies the TU 32 as a telematics unit. When the TU 32 is identified as a telematics unit, the MSC 14 creates a call record in the SS-ECR 26 that includes among other things a table mapping MEIDs of mobile stations such as the TU 32 to their PGIDs. The MSC 14 also sends an initial address message (IAM) to the TSP switch 28. An initial address message is used to establish the call between the TSP call center 27 and the TU 32. As shown, the IAM includes the called party number (CdPN) and the calling party number (CgPN). The called party number is the number for the TSP switch 28. The calling party number is the LPN assigned to the MSC 14. The MSC 14 also provides the TSP switch 28 with the MEID of the TU 32 in the ISUP generic address parameter (GAP). The TSP switch 28 creates a call record in the TSP-ECR 30 that includes among other things a table mapping the MEIDs of mobile stations to the LPNs of the associated MSCs.

This process establishes the call between the TU 32 and the TSP call center 27. Depending on the information communicated during the call, the TSP call center 27 may determine the appropriate response such as connecting the call with a PSAP if there is a true emergency, such as fire or bodily injury, or connecting the call with a secondary response service (e.g., a tow trucking service) for lesser emergencies. The TSP call center 27 then instructs the TSP switch 28 to send a call through MSC request to the TSP-ECR 30. The call through MSC request includes the LPN of the MSC 14, the MEID of the TU 32, and a service code. The service code indicates the type of service needed by the TU 32 as determined by the TSP call center 27. For example, the service code may indicate an emergency requiring connecting the call with a PSAP or may indicate a secondary response service such as a tow truck.

Using the LPN in the request, the TSP-ECR 30 accesses a look-up table stored therein that maps LPNs to SS-ECR addresses (e.g., a point code in the SS7 network). From this look-up table, the TSP-ECR 30 accesses the address for the SS-ECR 26, and sends the call through MSC request to the SS-ECR 26 over the Ed interface. Alternatively, the TSP-ECR 30 may send the call through MSC request to the SS-ECR 26 by using the well-known SS7 global title translation where the LPN is the global title. The call through MSC request sent by the TSP-ECR 30 includes the MEID of the mobile station and the service code.

When the SS-ECR 26 receives the call through MSC request, the SS-ECR 26 uses the MEID in the request to access the PGID from the mapping table stored therein. The SS-ECR 26 then sends the call through MSC request to the MSC 14. The call through MSC request includes the PGID and the service code. The MSC 14 determines a called party number based on the service code. For example, if the service code indicates an emergency, the MSC 14 determines 911 as the called party number.

In response to receiving an emergency call through MSC request, the MSC 14 also invokes a procedure such as J-STD-36A, which includes generating geolocation information (e.g., longitude and latitude of the TU 32).

If the service code indicates a non-emergency (e.g., a secondary response service such as towing), the MSC 14 invokes a geolocation procedure (e.g., a commercial equivalent to the J-STD-36A). Using the geolocation information, the MSC 14 accesses a service database (e.g., tow-truck service database) corresponding to the location of the TU 32, and accesses one of the numbers as the called party number.

Once this is obtained, the MSC 14 originates a call to, for example, a PSAP switch as shown in FIG. 5 or a secondary response service. The call is originated as the third leg of a three-way call using a conference bridge where the second leg is the original call from the TU 32 to the TSP call center 27. The IAM used to originate this call includes the called party number as determined above and the LPN as the calling party number. The IAM further includes the MEID of the TU 32 in the GAP, the geolocation information (e.g., longitude and latitude), and additional geolocation information particularly if the call is an emergency call. As shown, when the call is an emergency call the additional geolocation information may be sent in the generic digits parameter (GDP). Here, the GDP may be the well-known Emergency Service Routing Key (ESRK), which is used to derive the well-known Emergency Service Routing Digits (ERSD) for the local PSAP, or may be the ERSD itself. The ERSD is the routing number for the local PSAP.

According to this embodiment of the present invention, a second party service provider such as a TSP can effectively include a PSAP or secondary response service local to the mobile station (e.g., TU) in the call between the mobile station and the second party service provider. It will be appreciated that the second party service provider is not limited to the example given above, but could include numerous other types of service providers. For example, the second party service provider may be a PSAP that wants to include another PSAP serving another area in the emergency call. This would allow for coordinated handling of mobile emergencies (e.g., moving train or truck emergency) or a wide spread emergency (e.g., a chemical or nuclear accident).

The invention being thus described, it will be obvious that the same may be varied in many ways. Such variations are not to be regarded as a departure from the spirit and scope of the invention, and all such modifications are intended to be included within the scope of the following claims.

We claim:

1. A method of performing an emergency call back with a mobile station, comprising:
    sending a call back request from a call register associated with a public service answering point (PSAP) switch to another call register, the call back request requesting that a mobile switching center, serving the mobile station, establish a call between the mobile station and a public service answering point (PSAP).

2. The method of claim 1, wherein the sending step sends a mobile station identifier and a routing number of the PSAP switch, associated with the PSAP, with the request.

3. The method of claim 2, prior to the sending step, further comprising:
    receiving the routing number for the mobile switching center and the identifier of the mobile station with an emergency call from the mobile station.

4. The method of claim 3, further comprising:
    creating a record in the call register associated with the PSAP switch if the emergency call is received.

5. The method of claim 1, wherein the sending step performed by the call register associated with the PSAP switch, which is associated with the PSAP, is in response to a signal from the PSAP switch.

6. The method of claim 5, further comprising:
    accessing a routing number for a call register associated with the mobile switching center using a routing number for the mobile switching center received with the signal from the PSAP switch; and wherein
    the sending step sends the request to the call register associated with the mobile switching center using the accessed routing number.

7. The method of claim 1, wherein the call register associated with the PSAP switch, which is associated with the PSAP, sends the request to a call register associated with the mobile switching center.

8. A method of performing an emergency call back with a mobile station, comprising:
    receiving, at a call register associated with a mobile switching center, a call back request from a call register associated with the PSAP switch; and
    sending, in response to the call back request, a request to the mobile switching center that the mobile switching center establish a call between the mobile station and a Public Service Answering Point (PSAP).

9. The method of claim 8, further comprising:
    accessing a paging identifier for the mobile station based on a mobile station identifier received with the call back request; and wherein
    the sending step send the paging identifier along with the request to the mobile switching center.

10. A public service answering point (PSAP) system, comprising:
    a PSAP switch for handling emergency calls; and
    a PSAP call register for routing a call back request from the PSAP switch to a mobile switching center which served an emergency call from a mobile station identified in the call back request.

* * * * *